United States Patent [19]
Gady

[11] Patent Number: 5,934,711
[45] Date of Patent: Aug. 10, 1999

[54] MOLD SHOT RISER ELEMENT WITH O-RING SEALING

[75] Inventor: Richard Gady, Euclid, Ohio

[73] Assignee: Perfection Corporation, Madison, Ohio

[21] Appl. No.: 08/906,922

[22] Filed: Aug. 6, 1997

[51] Int. Cl.⁶ .................................................. F16L 11/12
[52] U.S. Cl. .......................... 285/45; 285/55; 285/351; 285/382
[58] Field of Search ............... 285/382, 45, 256, 285/351, 55

[56] References Cited

U.S. PATENT DOCUMENTS

| | | |
|---|---|---|
| 2,219,053 | 10/1940 | Osborn .................................... 285/382 |
| 2,832,503 | 4/1958 | Baumann ........................... 285/382 X |
| 3,837,686 | 9/1974 | Powell . |
| 3,987,820 | 10/1976 | Alewitz . |
| 4,005,880 | 2/1977 | Anderson et al. . |
| 4,094,536 | 6/1978 | Cole et al. . |
| 4,094,537 | 6/1978 | Lyall . |
| 4,284,297 | 8/1981 | Godkin . |
| 4,434,816 | 3/1984 | De Giovanni et al. . |
| 4,519,634 | 5/1985 | Hand . |
| 4,715,624 | 12/1987 | Frye . |
| 4,801,159 | 1/1989 | Sehorn . |
| 5,378,023 | 1/1995 | Olbrich .............................. 285/256 X |

FOREIGN PATENT DOCUMENTS

| | | | |
|---|---|---|---|
| 42551 | 12/1971 | Japan ..................................... 285/351 |
| 2254389 | 10/1992 | United Kingdom ................... 285/382 |

*Primary Examiner*—Dave W. Arola
*Attorney, Agent, or Firm*—Fay, Sharpe, Beall, Fagan, Minnich & McKee, LLP

[57] ABSTRACT

A gas riser apparatus having an O-ring sealing arrangement according to the present invention provides improved sealing between an inner pipe and an outer pipe of the riser apparatus. The riser apparatus includes an inner plastic pipe having one or more grooves for receiving resilient sealing members. A plurality of O-rings are disposed within one annular groove and an outer metal pipe is telescoped over the plastic pipe. An annular crimp extends around the outer metal pipe at a location of the plurality of O-rings and forms a seal between an inner surface of the metal pipe and an exterior of the plastic pipe by compressing the O-rings. This O-ring seal configuration provides substantially improved low temperature sealing.

12 Claims, 3 Drawing Sheets

MOLD SHOT RISER ELEMENT WITH O-RING SEALING

BACKGROUND OF THE INVENTION

The present invention relates to the field of conducting pressurized fluids in a plastic pipe, and more particularly to an apparatus for transporting natural gas from a source of supply to a delivery point.

Plastic pipe is now commonly being used for the underground transmission and delivery of fluids such as natural gas replacing the conventional steel pipe. The use of plastic pipe for the transmission of such fluids including natural gas, propane, butane, and others provides advantages of corrosion resistance, low cost, low weight, reliability, and flexibility but also requires specialized pipe connectors to connect to existing steel pipe fittings.

In the natural gas delivery field, plastic pipe is used to deliver gas from an underground gas main to an above ground gas meter for introduction into a building. However, safety and various government regulations require that any above ground portion of the plastic gas line be protected from possible damage or puncture. Thus, the above ground portion of the plastic pipe delivering the gas from the gas main to the gas meter is surrounded by a protective metallic pipe which also connects the plastic pipe to the gas meter. This metallic pipe must be secured around the plastic pipe in a gas tight manner.

A gas riser is used to connect an underground plastic gas delivery pipe to a gas meter. The gas riser is generally L-shaped in configuration and includes an outer metallic conduit or housing and an internal plastic pipe. The internal plastic pipe has an extended leg at a lower end which is adapted to be interconnected to an underground plastic pipe line using a plastic pipe sleeve coupling. At the upper end of the riser, a seal is provided between the inner plastic pipe and the surrounding metallic pipe to prevent gas from seeping into the annular space surrounding the internal plastic pipe. Threads on an upper end of the metallic outer pipe are adapted to engage a meter bar or meter manifold of a gas meter.

The seal between the metallic outer pipe and the plastic inner pipe is formed by providing one or more grooves on an exterior of the plastic pipe which each receive a sealing gasket, and crimping the metallic pipe at the location of each sealing gasket to form a seal. An example of such a sealing arrangement for a gas riser is shown in U.S. Pat. No. 3,987,820. However, with this gasket sealing arrangement expansion and contraction due to environmental temperature changes may compromise the seal between the metallic and plastic pipes allowing gas to escape into the environment.

SUMMARY OF THE INVENTION

The present invention addresses the problems associated with the known gas risers in which environmental temperature changes may cause leaks.

According to one aspect of the present invention, a gas riser apparatus includes an elongated plastic tube having a first end and a second end, the first end adapted to be positioned below the ground for attachment to an underground service line and the second end adapted to be disposed above ground level. A tubular metal stiffener is positioned inside the second end of the plastic tube and a mold shot is formed on an exterior of the second end of the plastic tube and defines a first annular groove on the exterior of the plastic tube. A plurality of O-rings are disposed within the first annular groove on the exterior of the plastic tube. An elongated rigid metal pipe surrounds the second end of the plastic tube and the plurality of O-rings. The metal pipe has a first end adapted to be positioned below ground level and a second end adapted to be positioned above ground level for attachment to a delivery point. An annular crimp extends around the elongated rigid metal pipe at a location of the plurality of O-rings and forms a seal between an inner surface of the metal pipe and the exterior of the plastic tube.

According to a more detailed aspect of the present invention, the gas riser apparatus includes a second annular groove and an annular gasket disposed within the second annular groove.

In accordance with a further aspect of the invention, a pipe connection includes an elongated plastic pipe having an exterior surface and an interior passage for transmitting fluid, at least one groove formed on the exterior surface of the plastic pipe, a plurality of O-rings received in the groove, an elongated rigid metal pipe surrounding a portion of the plastic pipe, and a first annular crimp extending around the elongated rigid metal pipe at a location of the plurality of O-rings. The first annular crimp compresses the plurality of O-rings between the plastic pipe and the metal pipe and forms a seal therebetween.

In accordance with an additional aspect of the invention, a method of sealing a joint between a plastic pipe and a metal pipe includes the steps of forming at least two grooves on an exterior of the plastic pipe, positioning a plurality of O-rings in a first of the at least two grooves, positioning a cylindrical shaped gasket in a second of the at least two grooves, telescoping a length of metal pipe over the O-rings and the gasket, and roll grooving the metal pipe to form a first annular crimp at the location of the O-rings and a second annular crimp at the location of the gasket.

One advantage of the present invention is the provision of a fitting for interconnecting two tubular members, one of which is plastic.

Another advantage of the present invention is the provision of a fitting for connecting tubular members of different materials and for preventing leaks due to low temperatures.

A further advantage of the present invention is the provision of a method of sealing a joint between a plastic and a metal pipe which prevents leaks over a wide temperature range.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
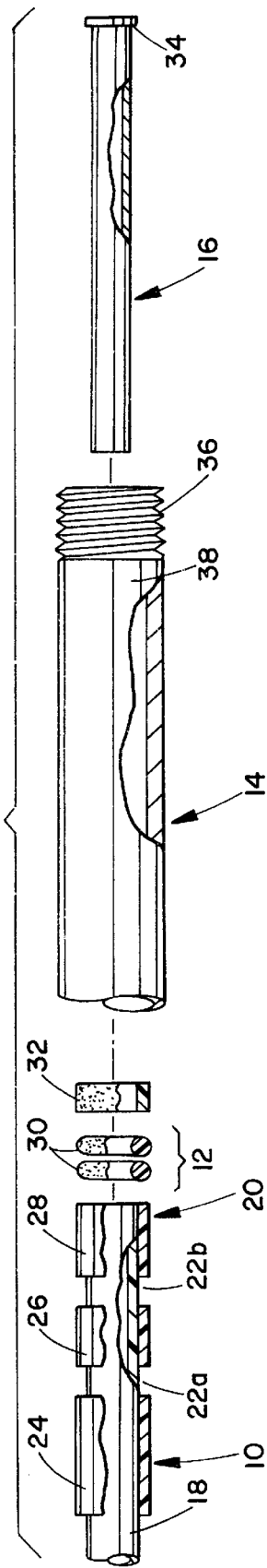
FIG. 1 is an exploded view of an upper end of a gas riser according to the present invention.
Figure 2:
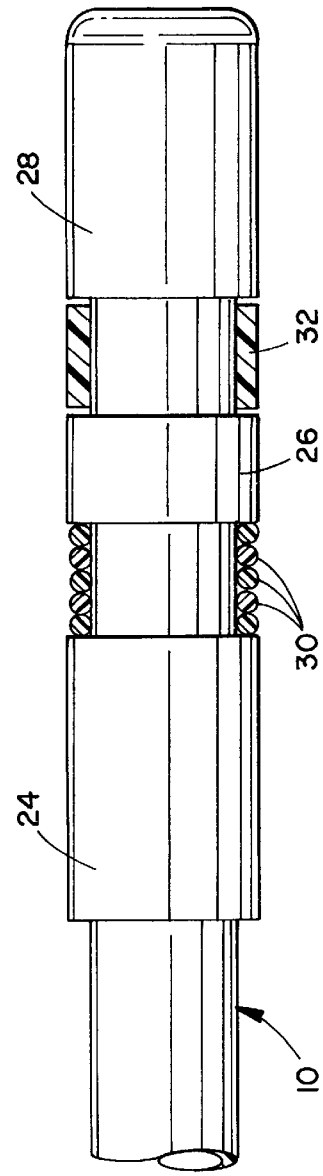
FIG. 2 is side view of an upper end of the inner pipe of FIG. 1 with the gasket and O-rings shown in cross section.
Figure 3:
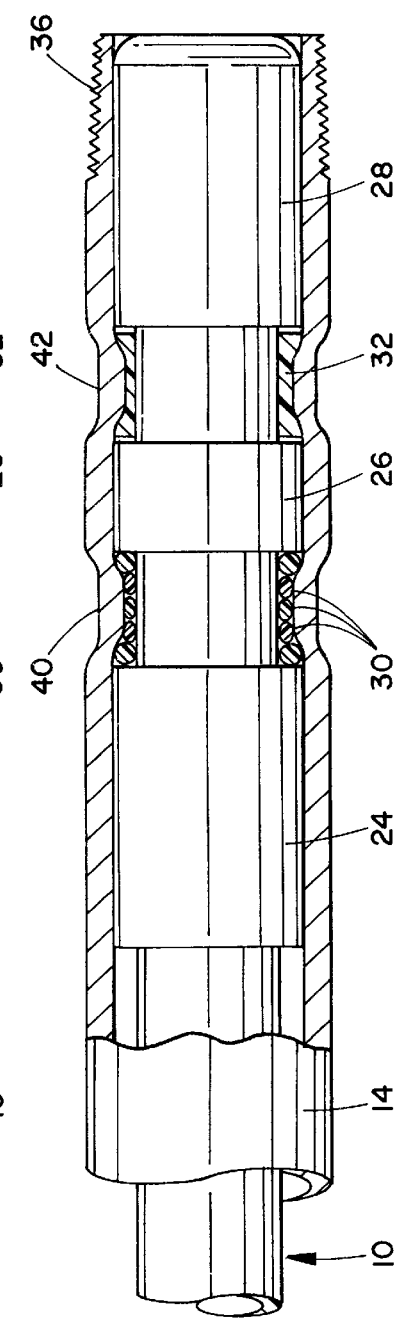
FIG. 3 is a side view of the upper end of the gas riser of FIG. 1 with the outer pipe, the gasket, and the O-rings shown in cross section.

Referring now to the drawings wherein the showings are for the purposes of illustrating the preferred embodiment of the invention only and not for purposes of limiting same, FIGS. 1–3 show an upper end of a gas riser assembly for connecting an underground plastic pipe line to a gas meter.

The riser assembly as shown in the exploded view of FIG. 1 includes an inner pipe 10, a plurality of sealing elements 12, an outer pipe 14, and a stiffener tube 16. The inner pipe 10 is a plastic pipe having a first end 18 adapted to be disposed below ground level as will become apparent from the following description. A second end 20 of the inner pipe 10 is disposed above ground and sealed to the outer pipe 14.

At the upper end 20 of the inner pipe 10, the exterior surface of the pipe is provided with series of annular grooves 22a, 22b. Sleeves 24, 26, and 28 of polyethylene injection molded material are cast around the end of the inner pipe 10 to form the annular grooves 22a, 22b. These grooves 22a, 22b defined by the sleeves 24, 26, 28 receive the sealing elements 12. The sleeves 24, 26, 28 are molded in place and tightly grip and adhere to the external surface of the inner pipe 10. The polyethylene material of the sleeves 24, 26, 28 has a tendency to shrink upon cooling and more tightly grip the external surface of the inner pipe 10. The sleeves 24, 26, 28 together constitute a mold shot which defines the grooves 22a, 22b for receiving and retaining the sealing elements 12. The grooves 22a, 22b may also be formed directly in an outer surface of the pipe 10, without the use of added sleeves.

The sealing elements 12 include a plurality of O-rings 30 and a cylindrical sealing gasket 32. The sleeves 24, 26, 28 define locating means for the O-rings 30 and gasket 32 which serve to capture the sealing elements and retain them in place.

When the riser assembly is assembled, the stiffener tube 16 is inserted inside the second end 20 of the inner pipe 10. The stiffener tube 16 is a metallic tube having an upper flange 34 which is received adjacent the upper or second end 20 of the inner pipe 10. The stiffener tube 16 prevents the collapse of the plastic inner pipe 10 when the metal outer pipe 14 is crimped onto the inner pipe. The stiffener tube 16 is fabricated from rigid material such as steel having a strength which prevents the plastic inner pipe 10 from collapsing due to the compressive force used to crimp the outer pipe 14.

The metal outer pipe 14 includes an upper end 36 having external threads 36 for attaching the outer pipe to either another conduit or to a delivery point apparatus such as a gas meter. The outer pipe 14 is telescoped over the inner pipe 10 having the stiffener tube 16 positioned therein. The outer pipe 14 is longitudinally positioned such that a smooth and unthreaded outer surface 38 of the outer pipe is disposed over each of the annular grooves 22a, 22b.

As shown in FIG. 2, the plurality of O-rings 30 are disposed within a first of the annular grooves 22a. The number of O-rings positioned within the annular groove 22a may vary depending on the size of the groove and the application. Preferably, the number of O-rings disposed in one groove is from two to ten O-rings. The gasket 32 is positioned around the inner pipe 10 within a second of the annular grooves 22b.

As shown in FIG. 3, once the outer pipe 14 has been place over the inner pipe 10, annular crimps 40 and 42 are formed around the outer pipe causing a compressive force to be exerted against the O-rings 30 and gasket 32. The crimps 40, 42 may be achieved by rolling the riser assembly within an appropriate die to distort or displace the metal of the outer pipe 14 and produce the radially inward extending corrugations or crimps 40, 42. The two crimps 40, 42 extend radially inward to a sufficient degree to compress the O-rings 30 and the gasket 32 in order to seal and lock the inner and outer pipes together.

Figure 5:
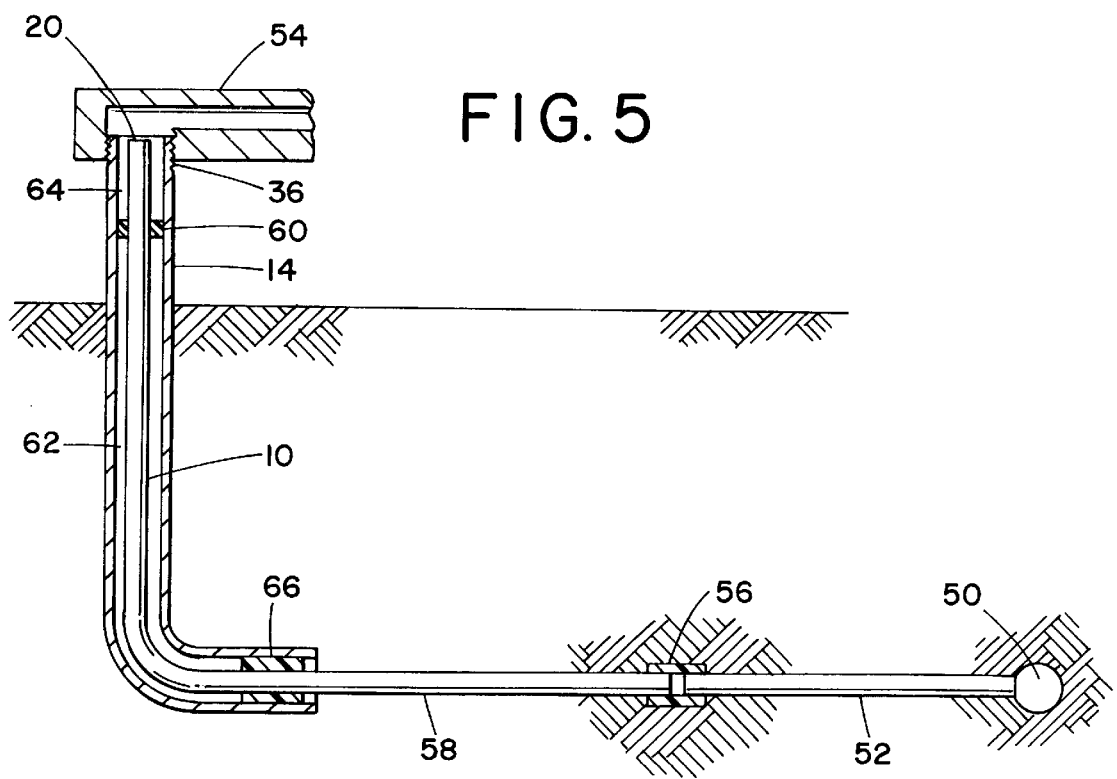
FIG. 5 is a schematic side view showing the attachment of a gas riser according to the present invention to a gas meter and underground supply line.
Figure 6:
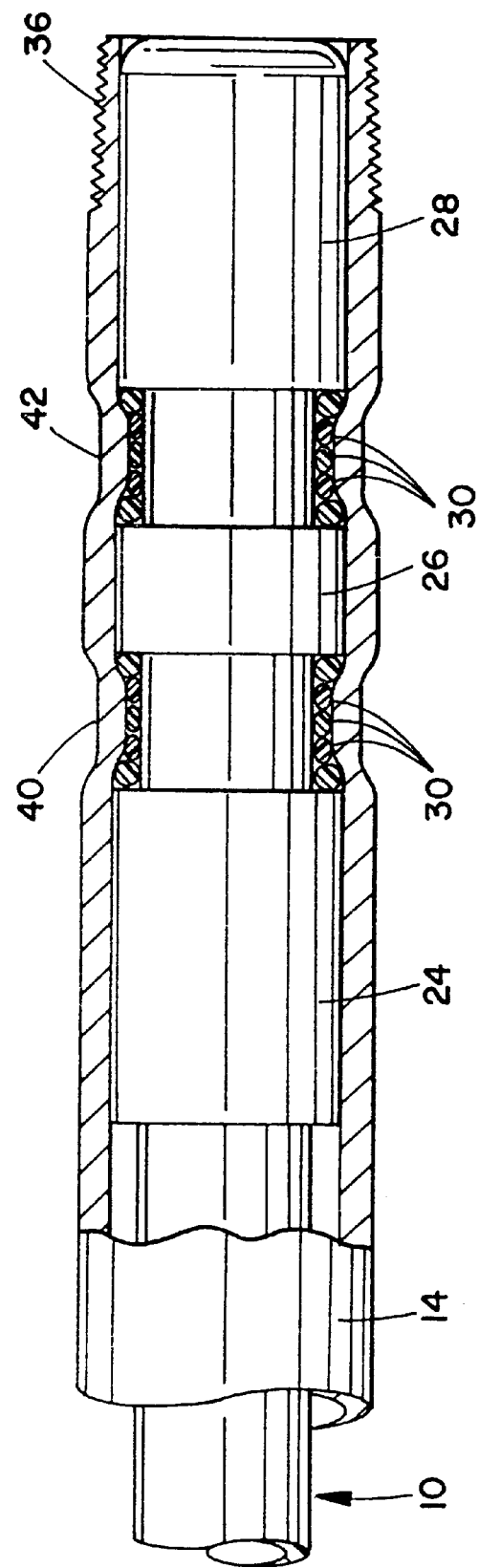
FIG. 6 is a side view of the upper end of a gas riser similar to that shown in FIG. 3, wherein the gasket is replaced by a series of O-rings.

Reference is now made to FIG. 5 which shows one schematic example of a riser assembly for transmission of natural gas from a gas main 50 to a gas meter 54 or the like. As shown in FIG. 5, a source of pressurized fluid or natural gas is provided by means of a gas main 50. Individual users of natural gas receive gas by means of a conduit 52 such as a plastic pipe extending from the gas main 50 to an underground location near the gas meter 54. The gas delivery conduit 52 is connected to the inner pipe 10 of the riser assembly by a plastic pipe coupling 56 in the form of a sleeve. An upper end 20 of the inner pipe 10 is positioned adjacent the gas meter 54. However, the plastic inner pipe 10 is not connected to the gas meter and does not form a seal with the gas meter. Rather, the upper end of the outer pipe 14 is connected to the gas meter 54 by the threaded portion 36 of the metal pipe. A seal 60 which is schematically illustrated in FIG. 5 limits the flow of fluid between the inner and outer pipes such that an annular space 62 between the inner and outer pipes below the seal 60 is not filled with pressurized gas. Only the limited annular space 64 above the seal 60 is filled with the pressurized gas. The seal 60 is preferably located above ground level. Thus, the outer pipe 14 acts as a carrier of fluid only for a small portion of its length above ground level and above the seal.

The outer pipe 14 of the riser apparatus of the present invention functions as a protective member for the portion of the inner pipe 10 which is positioned above ground but functions as a gas transmitting member for only a small distance. This is advantageous because any portion of the metal outer pipe 14 which is located below the seal 60 can experience corrosion without allowing any of the transmitted gas to escape due to the fact that the gas is flowing through the inner plastic pipe 10.

Figure 4:
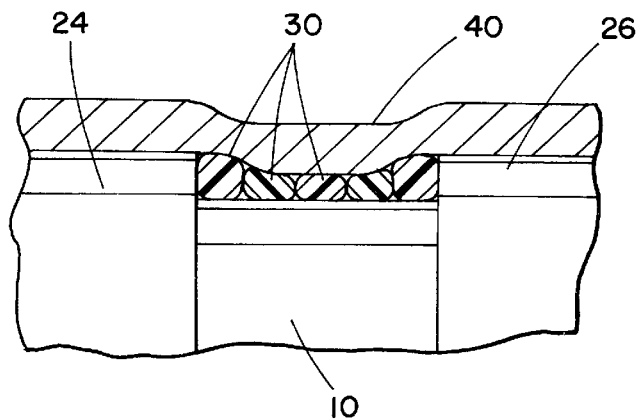
FIG. 4 is an enlarged side view of a portion of FIG. 3 including the O-rings.

The seal 60 which is illustrated schematically in FIG. 5 is the seal provided by the O-rings 30, the gasket 32, and the two crimps 40, 42 as shown in FIGS. 3 and 4. FIG. 5 also illustrates the lower end or leg 58 of the inner pipe 10 extending out of the outer pipe 14.

The riser apparatus of FIG. 5 may also include an additional lower seal 66 between the inner pipe 10 and the outer pipe 14 to prevent fluid, such as ground water, from entering the annular space 62 between the pipes. This seal 66 may employ one or more gaskets and/or O-rings, and one or more crimps as needed.

The use of a series of O-rings 30 disposed in the annular groove 22a of the inner pipe has been found to greatly improve cold temperature performance of the seal. In particular, a seal configuration as shown in FIG. 3 with five O-rings 30 and one gasket 32 can withstand temperatures as low as −20° F. and even as low as approximately −40° F. without leaking. This provides a substantial improvement over a riser including two identical cylindrical gasket seals 32 provided in each of the annular grooves.

Although the present invention has been described as employing a series of two to ten O-rings 30 in a first annular groove 22a and a gasket 32 in a second annular groove 22b, it should be understood that the location of the O-rings and the gasket may be modified without departing from the invention. For example, the O-rings 30 may be placed in the second groove 22b while the cylindrical gasket 32 may be placed in the first annular groove 22c and similar results of improved low temperature sealing will occur. In addition, a plurality of O-rings 30 may be provided in both of the annular grooves 22a, 22b to achieve additional sealing. Further, it should be understood that additional annular grooves and sealing elements 12 of different configurations may be provided as necessary to achieve further sealing.

According to one preferred embodiment of the present invention, the outer metal pipe 14 is fabricated from stainless steel and the inner plastic pipe 10 is formed from polyethylene. In addition, the sealing elements 12 including the gasket 32 and the O-rings 30 are preferably formed of a resilient elastomer material such as Buna-N nitrile rubber. However, it should be understood that other materials may also be employed in fabricating the inner and outer pipes and the sealing elements without departing from the invention. Further, the O-rings 30 may be elliptical in shape. The specific geometry of the O-rings 30 is influenced by the cross-sectional shape of the inner pipe 10 and the outer pipe 14.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A gas riser apparatus comprising:
   an elongated plastic tube having a first end and a second end, the first end adapted to be positioned below ground for attachment to an underground gas service line and the second end adapted to be disposed above ground level;
   a tubular metal stiffener positioned inside the second end of the plastic tube;
   a mold shot formed on an exterior of the second end of the plastic tube and defining a first annular groove on the exterior of the plastic tube;
   a plurality of O-rings disposed within the first annular groove on the exterior of the plastic tube;
   an elongated rigid metal pipe surrounding the second end of the plastic tube and the plurality of O-rings, the metal pipe having a first end and a second end, the first end adapted to be positioned below ground level and the second end adapted to be positioned above ground level for attachment to a delivery point; and
   an annular crimp extending around the elongated rigid metal pipe at a location of the plurality of O-rings and forming a seal between an inner surface of the metal pipe and the exterior of the plastic tube.

2. The gas riser apparatus of claim 1, wherein the mold shot defines a second annular groove on an exterior of the plastic tube.

3. The gas riser apparatus of claim 2, wherein an annular gasket is disposed within the second annular groove on the exterior of the plastic pipe.

4. The gas riser apparatus of claim 3, wherein a second annular crimp extends around the elongated rigid metal pipe at a location of the annular gasket forming a second seal between the inner surface of the metal pipe and the exterior of the plastic tube.

5. The gas riser apparatus of claim 2, wherein a second plurality of O-rings are disposed within the second annular groove on the exterior of the plastic pipe.

6. The gas riser apparatus of claim 5, wherein a second annular crimp extends around the elongated rigid metal pipe at a location of the second plurality of O-rings forming a second seal between the inner surface of the metal pipe and the exterior of the plastic tube.

7. The gas riser apparatus of claim 1, wherein the O-rings provide a leak proof seal at temperatures down to at least −20° F.

8. The gas riser apparatus of claim 1, wherein the second end of the metal pipe is threaded for connection to a gas meter.

9. A pipe connection comprising:
   an elongated plastic pipe having an exterior surface and an interior passage for transmitting fluid;
   at least one groove formed on the exterior surface of the plastic pipe;
   a plurality of O-rings received in the groove, said O-rings arranged in a series adjacent one another;
   an elongated rigid metal pipe surrounding a portion of the plastic pipe; and
   a first annular crimp extending around the elongated rigid metal pipe at a location of the plurality of O-rings, the first annular crimp compressing the plurality of O-rings between the plastic pipe and the metal pipe so that said series of O-rings, together, form a seal between said plastic and metal pipes.

10. The pipe connection according to claim 9, wherein the at least one groove comprises a first groove and a second groove, the plurality of O-rings are disposed in the first groove, and an annular gasket is disposed in the second groove.

11. The pipe connection according to claim 10, wherein a second annular crimp extends around the elongated rigid metal pipe at a location of the annular gasket, the second annular crimp compressing the annular gasket between the plastic pipe and the metal pipe and forming a second seal therebetween.

12. The pipe connection according to claim 11, wherein the first annular crimp and the second annular crimp together form a fluid tight seal which avoids leaks at temperatures as low as approximately −40° F.

* * * * *